United States Patent

[11] 3,545,616

| [72] | Inventors | Ronald A. Aspinwall<br>Detroit;<br>MacKellar K. Graham, Birmingham, Michigan |
|---|---|---|
| [21] | Appl. No. | 855,692 |
| [22] | Filed | Sept. 5, 1969 |
| [45] | Patented | Dec. 8, 1970 |
| [73] | Assignee | Sperry Rand Corporation<br>Troy, Michigan<br>a corporation of Delaware |

[54] FILTER AND INDICATOR MEANS
15 Claims, 6 Drawing Figs.

[52] U.S. Cl. .................................................... 210/90,
116/70, 210/130
[51] Int. Cl. ................................................ B01d 27/10
[50] Field of Search .......................................... 116/70;
137/556, 557; 210/90, 91, 130

[56] References Cited
UNITED STATES PATENTS

| 3,247,824 | 4/1966 | Rodgers | 116/70 |
| 3,291,307 | 12/1966 | Rosaen | 210/90 |
| 3,348,684 | 10/1967 | Wilber | 210/90 |
| 3,371,787 | 3/1968 | Kudlaty | 210/90 |

*Primary Examiner*—Samih N. Zaharna
*Attorney*—Barnes, Kisselle, Raisch and Choate ABSTRACT: A filter including a cylindrical filter element which is arranged to normally have fluid pass therethrough. A linear bypass valve is provided to bypass fluid directly to the outlet when the pressure at the inlet becomes excessive. Linear movement of the bypass valve causes external indicator means to indicate that the bypass valve has moved to an open position.

INVENTOR.
RONALD A. ASPINWALL
MACKELLAR K. GRAHAM
BY
Barnes, Kisselle, Laird & Choate
ATTORNEYS

PATENTED DEC 8 1970

INVENTOR.
RONALD A. ASPINWALL
MACKELLAR K. GRAHAM
BY
Barnes, Kisselle, Raisch & Choate
ATTORNEYS

FILTER AND INDICATOR MEANS

This invention relates to fluid filters.

BACKGROUND OF THE INVENTION

In fluid filters that are utilized for filtering hydraulic fluids and the like, it is essential to provide some type of external indicator to indicate that the filter has become contaminated and requires replacement.

Among the objects of the invention are to provide a filter having a novel filter bypass and condition indicator; which can be readily serviced; which provides easy visual indication; and which can be readily serviced and maintained.

SUMMARY OF THE INVENTION

A filter including a cylindrical filter element which is arranged to normally have fluid pass therethrough. A linear bypass valve is provided to bypass fluid directly to the outlet when the pressure at the inlet becomes excessive. Linear movement of the bypass valve causes external indicator means to indicate that the bypass valve has moved to an open position. The indicator may show the position of the bypass valve or in an alternate form may show that the bypass valve has moved but may have returned to its original position.

DESCRIPTION

Figures 1, 2:
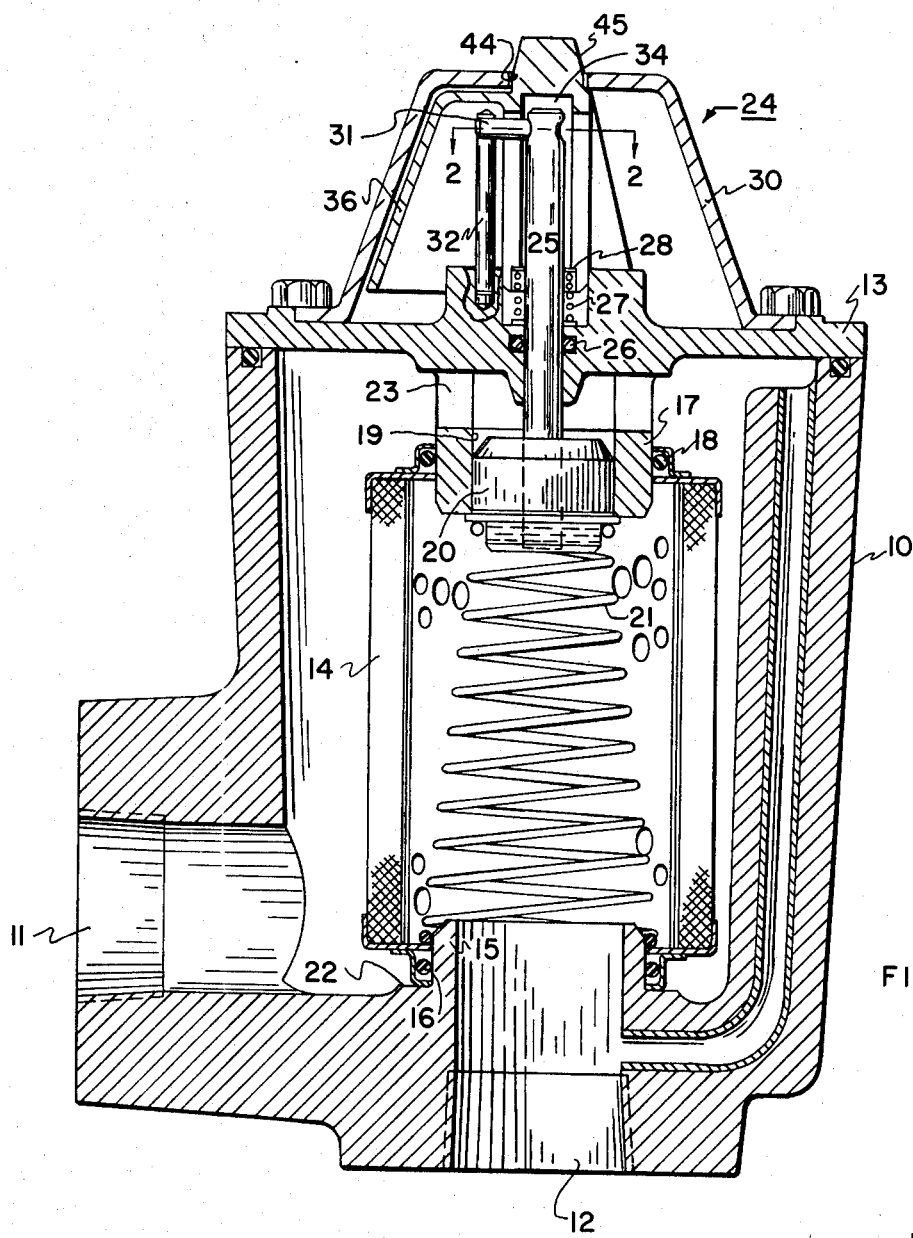
FIG. 1 is a longitudinal sectional view of a filter embodying the invention.
FIG. 2 is a sectional view taken along the line 2–2 in FIG. 1.
Figure 3:
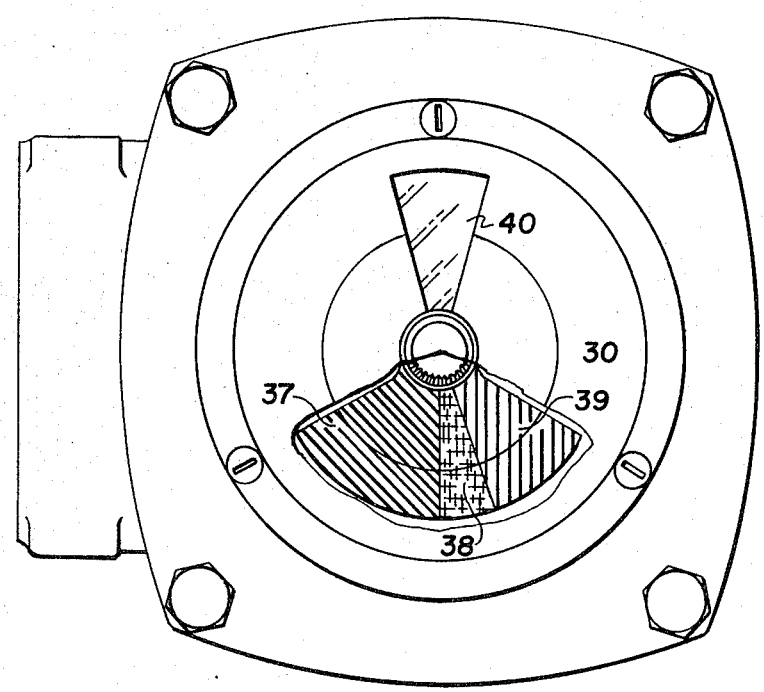
FIG. 3 is a top part sectional plan view of the filter shown in FIG. 1.

Referring to FIG. 1, a filter embodying the invention comprises a generally cylindrical housing 10 having a radial inlet 11 and an axial outlet 12. The housing includes a removable cover 13 that closes one end thereof opposite the axial outlet 12.

A cylindrical filter element 14 is positioned within the housing and has one end thereof sealingly engaging an axial projection 15 with an O-ring 16 forming the seal.

The other end of the filter element 14 is identical in construction and forms a seal with an axial projection 17 on the cover with an O-ring 18 again forming the actual seal.

The projection 17 includes an opening 19 in which a bypass valve 20 is positioned. The bypass valve 20 is yieldingly urged outwardly and upwardly as viewed in FIG. 1 by a helical spring 21 that is interposed between the valve 20 and the other end of the filter element, the spring serving the additional function of maintaining the filter element against the shoulder 22 of the housing. Axial projection 17 includes radial openings 23 that provide fluid communication between the inlet 11 and the other end of the bypass valve 20.

When the filter 14 becomes dirty, the bypass valve 20 will move axially inwardly and eventually open permitting fluid to be bypassed directly to the outlet 12. Indicating means 24 are provided on the cover 13 to indicate the fact that the filter is dirty and that the bypass valve 20 has moved. Specifically, the indicating means 24 comprises a stem 25 fixed to the valve 20 and extending outwardly through the cover 13 with an O-ring 26 forming the seal. A helical spring 27 engages between the outer surface of the cover 13 and a washer 28 which abuts an under portion of a rotatable indicator element 29 to yieldingly urge the indicator element 29 outwardly under light load against the inside of a frustoconical cover element 30.

A diametrically extending pin 31 is provided on the stem 25 and extends between stationary axial pins 32 (also shown in FIG. 2) to guide the movement of the stem 25 so that the stem cannot rotate during its axial movement. The indicator member 29 is mounted on the valve stem 25, being provided with a stem 33 having a bore 34 into which the valve stem 25 is inserted. The indicator member 29 is provided with a cam slot 35 on the stem 33 thereof (FIGS. 4—5) into which pin 31 of valve stem 25 extends. The cam slot 35 extends generally helically so that as the valve stem 25 is reciprocated due to movement of the bypass valve 20, the indicator member 29 will rotate. The indicator member 29 has laterally extending portions or wings 36 which have the outer surfaces thereof formed of different colors as at areas 37, 38, 39 such as green, yellow and red, respectively.

When the bypass valve 20 is in its normally closed position, the green area 37 can be viewed through transparent windows 40 in the sides of the cover 30.

As the bypass valve 20 is shifted axially inwardly as viewed in FIG. 1, the pin 31 which extends into and engages helical slot 35 will also move inwardly axially to cause the indicator member 29 to rotate clockwise as viewed in FIG. 1, bringing the yellow area 38 into view through the window 40. Further movement of the bypass valve 20 will rotate the indicator member 29 to bring the red area 39 into view.

When the bypass valve 20 returns to its original position, the pin 31 on valve stem 25 will cause the rotatable indicator member 29 to return to its original position.

Figure 4:
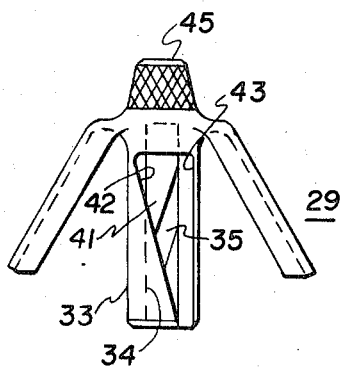
FIG. 4 is a side elevational view of a portion of the filter shown in FIGS. 1–3.
Figure 5:
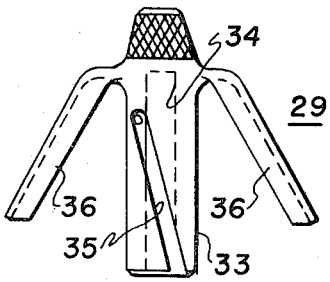
FIG. 5 is a side elevational view of another portion of the part of the filter shown in FIG. 4.
Figure 6:
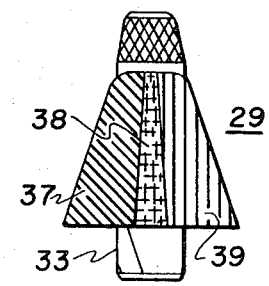
FIG. 6 is an end elevational view of the portion of the filter shown in FIGS. 4 and 5.

As shown in FIG. 4, the rotatable member 29 further includes a second cam slot 41 that has one side thereof following a helical path as at 42 and the other side thereof extending vertically as at 43.

By removing the cover 30 of the indicator assembly 24 and lifting the rotatable indicator assembly 24 and lifting the rotatable indicator member 29 and bringing the pin 31 into engagement with the cam slot 41, a different function can be achieved. Specifically, upon movement of the bypass valve 20 axially inwardly, the pin 31 will engage the helical portion 42 of slot 41 to move the yellow and red areas successively into view through the windows 40. However, when the bypass valve 20 returns, as in the case where the pressure increase may have been a temporary condition, the indicator 29 will remain in its original position since the portion 43 of the cam slot 41 extends vertically. This will indicate to an operator that the bypass valve 20 did move for some reason even though it has returned to its original position. A portion of the indicator 29 which extends upwardly through an opening 44 in the cover 30 is provided with a knurled knob 45 for resetting the rotatable indicator member 29 in the event that the slot 41 is being used, the knob being rotated counterclockwise to position pin 31 against helical path 42.

Cover 30 is preferably made of a plastic material which is resistant to hydraulic fluid and the like such as polycarbonate.

We claim:

1. A filter comprising:
   a housing having a cover;
   a filter element in said housing, said housing having an inlet extending to one side of said filter element and an outlet extending to the other side of said filter element;
   means on said housing closing one end of said filter element, and a linearly movable bypass valve closing the other end of said filter element;
   means communicating between the inlet side of said housing and said valve to cause linear movement of said valve when the pressure exceeds a predetermined value, and indicator means operable in response to movement of said bypass valve to indicate externally the movement of said bypass valve to a bypass position;
   said indicating means comprising:
   a stem on said valve;
   means for guiding said valve in a nonrotating linear path, said stem having a portion thereof extending through said cover outside said housing;

an indicator member rotatably mounted on said portion of said stem outside said housing, said indicator member having position indicating means thereon;

a cam slot in said indicator member, and a cam follower on said stem, said cam slot having at least a portion thereof extending in a generally helical fashion and said follower cooperating with said slot so that upon movement of said bypass valve to the opening position, said rotatable member is rotated to bring the indicating means into position to indicate an open position, said indicating means comprising bands of different colors on said rotatable member; and a cover over said indicator member, said indicator cover having an opening therein through which one of said colors may be viewed at a time whereby upon rotation of the indicator member, different colors are brought into view.

2. The combination set forth in claim 1 wherein said cover is made of plastic.

3. The combination set forth in claim 1 wherein said rotatable member has an additional portion thereof with different colored areas, said indicator cover having another opening therein through which said colored areas may be viewed.

4. The combination set forth in claim 3 wherein said indicator cover is generally conical, the viewing areas of said cover being in the sides of the indicator cover.

5. The combination set forth in claim 1 wherein said indicator member has a second cam slot which can be selectively engaged with said cam follower, said second cam slot having a configuration such that the rotatable member is returned to its original position upon movement of said bypass valve to a closed position, said first mentioned cam slot has another portion thereof extending generally axially whereby said rotatable member remains in its original position when the bypass valve returns to the closed position.

6. For use with a filter having a housing, a housing cover, a filter element within said housing and a bypass valve operable to provide communication between one side and the other of the element:

indicator means operable in response to movement of said bypass valve to indicate externally the movement of said bypass valve to a bypass position comprising a stem on said valve;

means for guiding said valve in a nonrotating linear path, said stem having a portion thereof extending through said cover outside said housing;

an indicator member rotatably mounted on said portion of said stem outside said housing, said indicator member having position indicating means thereon;

a cam slot in said indicator member, and a cam follower on said stem, said cam slot having at least a portion thereof extending in a generally helical fashion and said follower cooperating with said slot so that upon movement of said bypass valve to the opening position, said rotatable member is rotated to bring the indicating means into position to indicate an open position, said indicating means comprising bands of different colors on said rotatable member; and a cover on over said indicator member, said indicator cover having an opening therein through which one of said colors may be viewed at a time whereby upon rotation of the indicator member, different colors are brought into view.

7. The combination set forth in claim 6 wherein said indicator cover is made of plastic.

8. The combination set forth in claim 7 wherein said rotatable member has an additional portion thereof with different colored areas, an indicator cover having another opening therein through which said colored areas may be viewed.

9. The combination set forth in claim 8 wherein said indicator cover is generally conical, the viewing areas of said cover being in the sides of the indicator cover.

10. The combination set forth in claim 6 wherein said indicator member has a second cam slot which can be selectively engaged with said cam follower, said second cam slot having a configuration such that the rotatable member is returned to its original position upon movement of said bypass valve to a closed position, said first mentioned cam slot has another portion thereof extending generally axially whereby said rotatable member remains in its original position when the bypass valve returns to the closed position.

11. A filter comprising:
a housing having a cover;
a filter element in said housing, said housing having an inlet extending to one side of said filter element and an outlet extending to the other side of said filter element;

means on said housing closing one end of said filter element, and a linearly movable bypass valve closing the other end of said filter element;

means communicating between the inlet side of said housing and said valve to cause linear movement of said valve when the pressure exceeds a predetermined value, and indicator means operable in response to movement of said bypass valve to indicate externally the movement of said bypass valve to a bypass position, said indicating means comprising a stem on said valve, means for guiding said valve in a nonrotating linear path, said stem having a portion thereof extending through said cover outside said housing;

an indicator member rotatably mounted on said portion of said stem outside said housing, said indicator member having position indicating means thereon;

a cam slot in said indicator member, and a cam follower on said stem, said cam slot having at least a portion thereof extending in a generally helical fashion and said follower cooperating with said slot so that upon movement of said bypass valve to the opening position, said rotatable member is rotated to bring the indicating means into position to indicate an open position; and a cover over said indicator member, said indicator cover having an opening therein through which said indicating means may be selectively viewed.

12. The combination set forth in claim 11 wherein said indicator member has a second cam slot which can be selectively engaged with said cam follower, said second cam slot having a configuration such that the rotatable member is returned to its original position upon movement of said bypass valve to a closed position, said first mentioned cam slot has another portion thereof extending generally axially whereby said rotatable member remains in its original position when the bypass valve returns to the closed position.

13. For use with a filter having a housing, a housing cover, a filter element within said housing and a bypass valve operable to provide communication between one side and the other of the element:

indicator means operable in response to movement of said bypass valve to indicate externally the movement of said bypass valve to a bypass position comprising a stem on said valve;

means for guiding said valve in a nonrotating linear path, said stem having a portion thereof extending through said cover outside said housing;

an indicator member rotatably mounted on said portion of said stem outside said housing, said indicator member having position indicating means thereon;

a cam slot in said indicator member, and a cam follower on said stem, said cam slot having at least a portion thereof extending in a generally helical fashion and said follower cooperating with said slot so that upon movement of said bypass valve to the opening position, said rotatable member is rotated to bring the indicating means into position to indicate an open position; and a cover over said indicator member, said indicator cover having an opening therein through which said indicating means may be selectively viewed.

14. The combination set forth in claim 13 wherein said indicator member has a second cam slot which can be selectively engaged with said cam follower, said second cam slot having a configuration such that the rotatable member is returned to its original position upon movement of said bypass valve to a closed position, said first mentioned cam slot has another portion thereof extending generally axially whereby said rotatable member remains in its original position when the bypass valve returns to the closed position.

15. For use with a filter having a housing, a housing cover, a filter element within said housing and a bypass valve operable to provide communication between one side and the other of the element:

indicator means operable in response to movement of said bypass valve to indicate externally the movement of said bypass valve to a bypass position comprising a stem on said valve;

means for guiding said valve in a nonrotating linear path, said stem having a portion thereof extending through said cover outside said housing;

an indicator member rotatably mounted on said portion of said stem outside said housing, said indicator member having position indicating means means thereon; and a cam slot in said indicator member, and a cam follower on said stem, said cam slot having at least a portion thereof extending in a generally helical fashion and said follower cooperating with said slot so that upon movement of said bypass valve to the opening position, said rotatable member is rotated to bring the indicating means into position to indicate an open position, said indicator member having a second cam slot which can be selectively engaged with said cam follower, said second cam slot having a configuration such that the rotatable member is returned to its original position upon movement of said bypass valve to a closed position, said first mentioned cam slot has another portion thereof extending generally axially whereby said rotatable member remains in its original position when the bypass valve returns to the closed position.